United States Patent [19]

Rubin et al.

[11] Patent Number: 5,981,007
[45] Date of Patent: *Nov. 9, 1999

[54] EXTRUDED THERMOPLASTIC, LIQUID CRYSTALLINE POLYMERS AND BLENDS THEREOF HAVING A PLANAR MORPHOLOGY

[75] Inventors: Leslie S. Rubin, Newton; Kent G. Blizard, Framingham; Ross R. Haghighat, Acton; Richard W. Lusignea, Brighton, all of Mass.

[73] Assignee: Foster-Miller, Inc., Waltham, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/595,135

[22] Filed: Feb. 1, 1996

Related U.S. Application Data

[63] Continuation of application No. 08/130,643, Oct. 1, 1993, abandoned, which is a continuation of application No. PCT/US92/02616, Mar. 31, 1992.

[51] Int. Cl.$^6$ .............................. C08L 67/03; C08L 67/04; C08L 79/08
[52] U.S. Cl. .................... 428/35.5; 428/221; 525/132; 525/420; 525/425; 525/437; 525/439; 525/444; 525/450
[58] Field of Search ..................................... 525/425, 420, 525/132, 439, 437, 444, 450; 428/35.5, 221

[56] References Cited

U.S. PATENT DOCUMENTS

| | | |
|---|---|---|
| 3,637,595 | 1/1972 | Cottis et al. . |
| 3,847,867 | 11/1974 | Heath et al. . |
| 3,847,869 | 11/1974 | Williams, III . |
| 3,850,885 | 11/1974 | Takekoshi et al. . |
| 3,852,242 | 12/1974 | White . |
| 3,855,178 | 12/1974 | White et al. . |
| 3,916,048 | 10/1975 | Walles . |
| 3,962,314 | 6/1976 | Economy et al. . |
| 3,975,487 | 8/1976 | Cottis et al. . |
| 3,987,220 | 10/1976 | Bridgeford . |
| 4,141,927 | 2/1979 | White et al. . |
| 4,161,470 | 7/1979 | Calundann . |
| 4,250,279 | 2/1981 | Robeson et al. . |
| 4,256,624 | 3/1981 | Calundann . |
| 4,386,174 | 5/1983 | Cogswell et al. . |
| 4,410,482 | 10/1983 | Subramanian . |
| 4,416,942 | 11/1983 | DiLuccio . |
| 4,417,044 | 11/1983 | Parekh . |
| 4,438,236 | 3/1984 | Cogswell et al. . |
| 4,444,817 | 4/1984 | Subramanian . |
| 4,460,735 | 7/1984 | Froix . |
| 4,565,850 | 1/1986 | Prevorsek et al. . |
| 4,567,227 | 1/1986 | Kiss . |
| 4,652,490 | 3/1987 | Arita ........................... 428/347 |
| 4,726,998 | 2/1988 | Ikenaga ........................ 428/480 |
| 4,728,698 | 3/1988 | Isayev et al. . |
| 4,738,811 | 4/1988 | Hara ........................... 528/271 |
| 4,792,476 | 12/1988 | Numata ........................ 428/209 |
| 4,798,875 | 1/1989 | Itoyama ........................ 525/444 |
| 4,835,047 | 5/1989 | Isayev et al. . |
| 4,845,169 | 7/1989 | Abu-Isa et al. . |
| 4,871,817 | 10/1989 | Rock . |
| 5,156,785 | 10/1992 | Zdrahala . |
| 5,188,784 | 2/1993 | Kamai et al. . |
| 5,248,305 | 9/1993 | Zdrahala . |

FOREIGN PATENT DOCUMENTS

| | | |
|---|---|---|
| 0 369 734 | 5/1990 | European Pat. Off. . |
| WO 93/24574 | 12/1993 | WIPO . |

OTHER PUBLICATIONS

M. Alger et al., "Retortable Food Containers Containing A Water–Sensitive Oxygen Barrier", *ACS*, pp. 24–25 (1989).

T.C. Bissot, "Effects of Platelet Orientation on Performance of High Barrier Resins with Platelet–Type Fillers", *ACS*, pp. 26–27 (1989).

Blizard et al., "Extrusion of High Temperature Hemotropic Liquid Crystalline Polymmer Microcomposites", *Ultralloy Conference* (Brussels: Oct. 1990) and *Compalloy Conference* (Houston: Nov. 1990).

Brown et al., "Polymers Reinforce Themselves", *Aeropsapce America*, pp. 28–35, (Jan. 1991).

Dutta et al., "Polymer Blends Containing Liquid Crystals: A Review", *Polymer Engineering and Science Mid–September 1990*, vol. 30, No. 17, p. 1005.

Elandjian et al., "Effects of Additives on the Processing And Properties of LARC–TPI Polyimide", 35th International SAMPE Symposium, pp. 189–198, Apr. 2–5, 1990.

Evans et al., "Budding Technologies for Composites Detailed in SAMPE Papers", *Plastics Technology*, pp. 29–36, (Aug. 1990).

A. Fetell, "New Idea in Blow Molding: Laminar Barrier Containers", *Modern Plastics*, pp. 97–99, (May 1985).

A. Fetell, "A Barrier Breakthrough—Selar Barrier Resin", pp. 47–58.

Gabriele et al., "How to Process LCP's", *Plastics Technology*, pp. 92–98, (Apr. 1990).

Gabriele et al., "Biaxial Oriented Film Technique Exploits Properties of LCP's", *Plastics Technology*, pp. 35–39, (Feb. 1991).

Haghighat et al., "Biaxial Extrusion of Plyimide LARC–TPI and LARC–TPI Blends", *Materials Research Society*, (Dec. 1989), Boston.

(List continued on next page.)

*Primary Examiner*—Patricia A. Short
*Attorney, Agent, or Firm*—David G. Conlin; Linda M. Buckley

[57] ABSTRACT

The present invention relates to articles of manfacture, such as films, tubes, and coatings, comprising a multiaxially oriented film having a planar morphology, wherein the article of manfacture comprises at least one thermoplastic flexible polymer, at least one thermotropic liquid crystalline polymer, or a blend thereof. Recyclable articles of manufacture having improved barrier properties are also provided.

17 Claims, 14 Drawing Sheets

OTHER PUBLICATIONS

Kreisher et al., "Exotic Polyimide (with LCP) for High–Tech Films", *Modern Plastics*, (Oct. 1990).

D. McCauley, "Toughened Polyester for Barrier Films", *Tappi Journel*, pp. 159–163, (Jun. 1988).

R. Shastri et al., "Effect of Orientation on Permeability of Competitive Oxygen Barrier Resins", *ACS*, pp. 539–541, (1987).

Stevens, "The Unusual World of Liquid Crystal Polymers" *ME*, pp. 29–32, (Jan. 1991).

Subramanian, "Polymer Blends: Morphology and Solvent Barriers", Ch. 13 in "Barrier Properties of Polymers", *ACS*, pp. 252–265, (1990).

Thomas et al., "Films From Liquid Crystals?", *Chemtech*, pp. 546–550, (Sep. 1990).

J. Torradas et al., "New Laminar Oxygen Barrier Technology For Food Packaging Applications", *ANTEC 91*, pp. 1468–1470, (1991).

Foster–Miller, Inc., "Polyimide/LCP Blends", Dec. 1990, vol. 1, No. 8, pp. 1–4.

Foster–Miller, Inc., "LCP Extruded Products Press Release", Foster–Miller Announces Film Extrusion and Orientation Technology For Liquid Crystal Polyester (LCP) and Thermoplastic Blends, Oct. 2, 1990.

Dupont, "Highest Barrier For Retort Applications", *Selar Oh Plus*.

Dupont "What's New in High Barriers? Dupont's Amorphous Nylons", *Packaging*, pp. 60–61, (1986).

"LCP Superblends", *High Tech. Materials Alert*, p. 2, (Nov. 1990).

"Novel LCP Extrusion", *Asian Plastics News*, p. 37, (Dec. 1990).

"Liquid Crystal Polymers Offer Diverse Properties In Blends", *Modern Plastics International*, (Jan. 1991).

EXTRUDED THERMOPLASTIC, LIQUID CRYSTALLINE POLYMERS AND BLENDS THEREOF HAVING A PLANAR MORPHOLOGY

This application is a continuation of application Ser. No. 08/130,643 filed Oct. 1, 1993, now abandoned, which is a continuation of International Application PCT/US92/02616 filed on Mar. 31, 1992 and which designated the U.S.

STATEMENT OF GOVERNMENT INTEREST

Funding for the present invention was obtained from the Government of the United States by virtue of Contract Nos. NAS1-18527, NAS1-19025 and NAS1-19302 from the National Aeronautics and Space Administration. Thus, the Government of the United States has certain rights in and to the invention claimed herein.

FIELD OF THE INVENTION

This invention relates to the extrusion of multiaxially oriented articles of manufacture having a planar morphology from thermoplastic flexible polymers, thermotropic liquid crystalline polymers, (homopolymers, copolymers, and the like) and blends containing thermoplastic flexible polymers and thermotropic liquid crystalline polymers. Preferred thermoplastic flexible polymers include polyimide, polypropylene, polycarbonate and polystyrene. Preferred thermotropic liquid crystalline polymers include those commercially available thermotropic polymers sold under the trade names of XYDAR® LCP and VECTRA® LCP.

BACKGROUND

There is a growing demand for high temperature and high performance polymers. It is particularly desirable to be able to control the molecular orientation of such polymers and to tailor the coefficient of thermal expansion (CTE) to optimize properties.

Polymers having improved properties have been obtained by the incorporation of reinforcing fibers, such as, glass, carbon and aramid, to form fiber reinforced polymers. However, disadvantages well known to those of ordinary skill in the art accompany the use of each of these reinforcing fibers.

Performance gains over fiber reinforced polymers have been achieved by blending thermoplastic flexible polymers with thermotropic rigid-rod polymers which are also called thermotropic liquid crystalline polymers (TLCPs). These blends are sometimes referred to as polymer microcomposites.

Thermoplastic polymers used in making reinforced polymer composites, such as those described above, include a wide range of thermoplastics, such as polyimides, polyethylene, polystyrene and copolymers thereof, polyamides, polycarbonates, polyetherimide and polyesters such as polybutylene terephthalate. These thermoplastic polymers are either amorphous or semi-crystalline and may be called flexible chain polymers, since individual monomer units in the polymer chain are free to rotate with respect to each other so that the polymer chain may assume a random shape.

Thermotropic LCPs are a relatively new class of polymeric materials which combine the advantages of melt processability and outstanding mechanical properties. Due to their rigid-rod molecular conformation and capability to form highly oriented crystalline structures, i.e., an ordered phase when subjected to shear above their melting point, they form products with properties similar to fiber reinforced composites. However, if the orientation of the polymer is in only one direction, such products are not suitable for applications requiring strength in more than one direction. Because of their rigid backbone structure with flexible spacer groups, commercially available TLCPs have far higher tensile strength and flexural moduli than conventional polymers.

Thermotropic LCPs can be processed in the melt state and they are capable of forming a highly oriented fibrillar structure when subjected to shear above their melting point. Methods for producing such highly oriented fibrillar structures are disclosed in U.S. Pat. Nos. 4,973,442; 4,939,325; 4,963,428; and 4,966,807 (hereinafter referred to collectively as the "CRD Patents"). The disclosure of each of these patents is incorporated herein by reference. A brief discussion of this methodology follows.

A schematic diagram of the process disclosed in the CRD Patents is shown in FIGS. 1A and 1B. A combination of shear and elongational flows during the extrusion process orients the TLCP polymers. This controlled orientation can be accomplished with the counter-rotating die shown in FIG. 1A that aligns TLCP molecules along at least two distinct axes within a single ply. The angle that the TLCP fibrils make with the longitudinal axis of the film is ±theta, where theta can be varied from near zero to over 50 degrees. By rotating the mandrels, a transverse shear flow is superimposed on the axial shear developed as the polymer melt is extruded through the die. It is possible to obtain films in accordance with the CRD Patents having a thickness ranging from about 0.0001 to 0.060 inches.

In the CRD Patents, the objective was to obtain extruded articles, such as films and tubular components, having optimized tensile strength, tensile modulus, coefficient of thermal expansion, and other properties related to in-plane stresses and deflections of the film. As disclosed in the CRD Patents, such properties can be controlled and enhanced by alignment, orientation and organization of the rigid thermotropic LCP molecules. In the technology disclosed in the CPD Patents, reinforcement is achieved by the LCPs in fibrillar form. This morphology was observed directly microscopically and indirectly through effect on mechanical properties.

In such methods, subsequent post-die processing enhances the orientation already present as the material exits the die. For example, post processing such as post-die draw in the transverse and/or machine direction can be performed on the extruded article to further optimize properties or obtain a finished product.

Because TLCPs form an ordered phase in the melt (hence, the name thermotropic), they have shear viscosities far lower than other polymers, This property gives them potential importance as a processing aid.

Thermotropic liquid crystalline polymers have received increasing attention in the scientific and technical literature as in situ reinforcements in polymer blends and microcomposites. The range of high performance thermoplastic flexible polymers blended with TLCPs include polyimides, polyamides, PES, PEI, PEEK, polycarbonate, PET, PPS, and polyarylace. The blending of thermoplastic flexible polymers and LCPs occur at various size scales down to the molecular level to form the systems referred to as polymer microcomposites (PMC).

The microstructure of a polymer microcomposite is similar to fiber-reinforced composites except that the fibers are at a micron to submicron scale. Blends of thermoplastic polymers and TLCPs are disclosed, e.g., in U.S. Pat. Nos. 4,386,174; 4,728,698; 4,835,047; and 4,871,817, the disclosures of which are incorporated herein by reference.

The potential advantages of blending thermoplastic matrix polymers with thermotropic LCPs are well recognized. Yet, despite the potential advantages of combining thermoplastics with TLCPs, traditional processing steps have failed to yield the optimal properties desired in blends. To achieve the optimal properties with such blends, processing techniques are used that permit the controlled orientation of the rigid-rod polymer in melt state and subsequent freezing in the desired morphology.

Although fibers and films of LCP blends have shown the most promise in terms of properties, they typically have consisted of a highly uniaxially oriented structure with correspondingly inferior transverse properties. This anisotropy is the bane of thermotropic LCP blends, limiting their use primarily to spun fibers. To extend the applications of thermoplastic flexible polymers/TLCP blends to two and three dimensional articles, the fibrillar orientation of the TLCP reinforcing phase must be controlled. Indeed, the processing of such blends into films, tubes, and other structures has been severely hindered by the difficulties encountered in con-rolling the orientation and CTE of the final product.

Until recently it had not been possible to form articles, such as films and tubes, comprising blends of thermoplastic flexible polymers and TLCPs and to obtain controlled multiaxial orientation of such articles. Such articles and methods of obtaining them are disclosed in application Ser. No. 07/678,080, filed Apr. 1, 1991, now abandoned. One such method involves use of a counter-rotating die (CRD) and the technology disclosed in the CRD Patents, supra.

In general, a multiaxially oriented article is produced which has a tailored CTE and comprises at least one thermotropic LCP and at least one thermoplastic flexible. The method comprises:

(i) extruding a melt of the polymer or polymers, under conditions which impart axial and transverse shear thereto to form a multiaxially oriented article; and (ii) maintaining the article under conditions to enable solidification of the orientation formed in step (i).

The method may further comprise the step of subjecting the article to post-die draw in the axial and/or transverse direction between steps (i) and (ii). When it is desirable to increase the bend and fracture toughness of the article, e.g., the film or tube, the film or tube is stretched at above the Tg of the thermoplastic flexible polymer.

Co-pending Ser. No. 07/678,080 filed Apr. 11, 1991, now abandoned teaches that LCP-thermoplastic blends can be processed as disclosed in the CRD Patents to achieve fibrillar morphology and to orient the fibrils during processing to greatly improve mechanical properties with only small amounts of LCP (10% for example) in the blend.

A major problem currently exists in the packaging industry because of the relatively poor barrier properties of plastic materials used in films, bags, bottles, cars and ocher containers. Packaging materials have long since been developed with excellent barrier properties, but they do so with multiple layers, typically three to seven layers, including separate layers for oxygen and moisture barriers. Although special co-extrusion machinery has been developed to make such films, they are still perceived as being environmentally "unfriendly" because they cannot be recycled. Also, co-extrusion requires the use of secondary "tie" layers to bond the other layers together, and the machinery is generally more expensive to build and operate than equipment for extrusion and processing of single polymer materials.

Furthermore, it is not possible to recycle most of such multiple layer packaging materials, because the components of the multi-layers are irreversibly melted together during thermoplastic recycling. Plastic materials which can be recycled (such as polyethylene) are not very good barriers to gases such as oxygen, air and water vapor, and therefore cannot be used for long storage times. Accordingly, materials which combine excellent barrier properties with ability to recycle, creating a new generation of food and beverage packaging materials are being sought.

SUMMARY OF THE INVENTION

The present invention provides multiaxially oriented articles, such as films, tubes and coatings, having a planar or laminar morphology and comprising at least one thermoplastic flexible polymer, at least one thermotropic rigid-rod polymer, i.e., thermotropic liquid crystalline polymer (TLCP), and blends thereof.

It has unexpectedly beer found that the processing technology disclosed in the CRD Patents and in Ser. No. 07/678,080 filed Apr. 1, 1991, now abandoned, can be controlled to produce multiaxially oriented articles having a planar rather than fibrillar morphology. It has also unexpectedly been discovered that the highly oriented planar or laminar morphology of the present invention provides enhanced barrier properties over the fibrillar morphology disclosed in the CRD Patents and in Ser. No. 07/678,080 filed Apr. 1, 1991, now abandoned.

By the fibrillar morphology disclosed in the CRP Patents and in Ser. No. 07/678,080 filed Apr. 1, 1991, now abandoned, is meant that discrete fibrils are formed and oriented as illustrated in FIG. 2C, i.e., multiaxially oriented. FIGS. 2A and 2C illustrate the various orientations imparted to rigid-rod polymers by stress conditions. Typically, LCP polymers subjected to shear stress assume a uniaxial orientation as illustrated in FIG. 2A. Ordered polymers in solution have the scattered or random nematic orientation illustrated in FIG. 2B. FIG. 2C illustrates the twisted nematic (or cholesteric) orientation imparted to ordered polymers by processing under the method of the CRD Patents and Ser. No. 07/678,080 filed Apr. 1, 1991, now abandoned.

In contrast, in a planar or laminar morphology or microstructure as shown in FIG. 3A, the two-dimensional laminar layers are much less thick than the entire film, they overlap one another, and they extend over the entire length and width of the film. In comparison, a composite film made by conventional compounding and extrusion methods will contain discrete polymer regions which are not laminar and do not overlap. In many cases, such as the blending of LCPs and thermoplastics, workers report droplets of one component in the other, as shown in FIG. 3B. Such a droplet, if extruded under conditions to produce a fibrillar microstructure, e.g. as disclosed in the CRD patents, will not improve the barrier properties of the composite as does the planar morphology of the present invention.

By using transverse shear and control of temperature during extrusion in accordance with the teachings of the present invention, the polymer layers are put in series providing the best barrier, rather than in parallel (see FIG. 8) where gases can permeate through the path of least resistance. In other words, shear forces applied to the polymers during film extrusion impart a planar or laminar arrangement of the polymer molecules, much like a deck of cards, resulting in high resistance to gas permeation through the film The planar morphology provides improved resistance to gas permeability through the thickness of the articles of the present invention. This morphology also enhances dielectric properties, such as, dielectric constant, dielectric breakdown strength and tan delta. Accordingly, the present invention also provides articles of manufacture, e.g., films, tubes and coatings having improved barrier and dielectric properties.

Some advantages provided by the planar morphology of the present invention over other barrier layers are: it can replace multi-layer materials with a single layer resulting in the ability to recycle and reduce manufacturing costs, it can reduce the thickness of the barrier layer resulting in a cost savings and reduction of material to dispose or recycle, since it contains no metal layers it can be used with microwave cooking, and it can be used with many conventional fabrication methods (such as heat sealing) common to the food packaging industry. Other benefits of the invention will be apparent from the discussion and examples.

Thermoplastic flexible polymers suitable for use in the present invention include polyimide, polypropylene, polycarbonate and polystyrene, and blends thereof. Polyimide represent one type of preferred polymers. See FIG. 4A. Polyimides such as LARC-TPI,® and ARUM.® formerly known as NEW-TPI,® are particularly preferred polymers for use in the present invention. The structure of LARC-TPI,® is shown in FIG. 4B and of ARUM® is shown in FIG. 4C. LARC-TPI® and ARUM® are available from Mitsui-Toatsu Chemicals, Inc.

Thermotropic LCPs suitable for use in the present invention include, e.g., wholly and partially aromatic polyester and copolyesters. XYDAR® see FIG. 5A, is one such preferred polymer for use in the present invention (available from Amoco Performance Products, Inc.) and is based on terephthalic acid, p,p'-dihydroxybiphenyl, and p-hydroxybenzoic acid. VECTRA® see FIG. 5B and 5C, is another preferred TLCP for use in the present invention (available from Hoechst Celanese Corp.) and can be characterized as primarily aromatic polyesters based on parahydroxybenzoic acid and hydroxynaphthoic acid. Both types of polyesters contain relatively rigid chains of long, flat monomer units which undergo ordering in the melt. They are also referred to as nematic, anisotropic, or self-reinforcing polymers.

In embodiments of the present invention wherein the article comprises a blend of thermotropic LCP and thermoplastic flexible polymer the proportion of polymers selected will depend upon the intended use of the final article produced therefrom. In preferred blends, the thermoplastic flexible polymer is present at from about 99 to 50 weight % and the thermotropic rigid-rod polymer is present at from about 1 to 50 weight %. In one particularly preferred embodiment, the thermoplastic polymer is present at about from less than 95 percent to greater than 80 percent and the TLCP is present at about from greater than 5 percent to less than 20 percent.

In selecting thermoplastic flexible polymers and TLCPs for use in the blends of the present invention, both the thermodynamic and rheological properties of these polymers must be considered.

In particularly preferred embodiments of the present invention, LARC-TPI,® ARUM® and mixtures thereof, are blended with XYDAR® or VECTAO® TLCPs and melt extruded by utilizing a counter-rotating die to produce a multiaxially oriented film having a planar morphology through varying the processing parameters, particularly the temperature and transverse shear, in accordance with the teachings of the present invention. These films have a multiaxial orientation in the TLCP phase and have a planar morphology, as well as improved barrier properties.

An immediate advantage of such composite films is that the barrier properties are as good or better than "environmentally unfriendly" multi-layer laminated packages that can not be recycled.

This development is of interest to the food and beverage packaging industry, because it can replace the complex, multi-layer laminated structures typical of packaging where strength, toughness and barrier properties are all required, such as snack food bags, juice boxes, frozen foods packaging and beverage bottling.

Films comprising the TLCP/thermoplastic blends of the present invention should exhibit the low permeability properties of multi-layer packaging, but should be fully recyclable. A film processed using the teachings of the present invention is two orders of magnitude less permeable to oxygen and water vapor that PVDC and is not thought co be toxic, based on currently available information. This unique combination makes it possible to produce containers for carbonated fluids, for example, with extended shelf-life. Furthermore, the TLCP/thermoplastic flexible polymer blends of the present invention are recyclable. These recyclable LCP blends provide other key advantages over multi-layer packages, including:

Potentially lower product cost

Wider range of performance (higher temperature, strength)

Ability to form into articles of manufacture not possible with multi-layer films The cost of TLCP/thermoplastic flexible polymer blend packaging should be less than multi-layers because less complex and expensive extrusion equipment will be needed. Also, the barrier performance of the LCP portion of the blend is 100 to 1,000 times higher than the base plastic portion, so the cost per unit performance of the blend is actually less than the basic plastic itself.

The properties of LCP blends of the present invention are likely to be better than most packaging materials, based on the strength, high temperature capability, chemical inertness, tear resistance, wet strength, and fatigue strength of the LCP's.

DETAILED DESCRIPTION OF THE INVENTION

The present invention provides multiaxially oriented structures, such as films, coatings, and tubes, having a planar or laminar morphology, and methods of making such structures. The structures of the present invention comprise at least one thermotropic LCP, at least ore thermoplastic flexible polymer, or are formed from a blend comprising at least one thermoplastic flexible polymer and at least one thermotropic rigid-rod polymer.

The following definitions of multiaxially oriented film characteristics are useful in understanding the present invention:

| | |
|---|---|
| balanced biaxial | a film having maximum strength and stiffness at approximately ± 45 deg. to the machine direction, but exhibiting the least angular dependence of these properties. |
| predominantly | a film having maximum strength and stiffness in the uniaxial machine direction, but also with some strength within ± 20 deg. of the machine direction. |
| nearly uniaxial | a film having maximum strength and stiffness in the machine direction, with some strength within only ± 5 deg. of the machine direction. |

As used herein, the generic term for those orientations not meeting specific definitions above, but providing strength to a film in both the machine and transverse directions is "multiaxial."

Thermoplastic flexible polymers useful in the practice of the present invention, include polyimide, polypropylene, polycarbonate, and polystyrene. Such thermoplastic polymers are selected, in part, on the basis of properties, such as melt viscosity and thermal stability.

Thermoplastic flexible polymers for melt extrusion in accordance with the present invention typically have a melt viscosity in the range of about 10E4 to 10E5 poise. Additives may be incorporated into these polymers to bring the viscosity into the appropriate range.

The thermal stability of such polymers must be taken into consideration because the polymer must not significantly degrade during extrusion. Extrusion at lower temperatures can reduce the thermal degradation of a particular thermoplastic. However, this must be balanced against any increase in polymer viscosity caused by dropping the temperature. Other desirable characteristics include low outgassing and good flow.

Figure 4A:
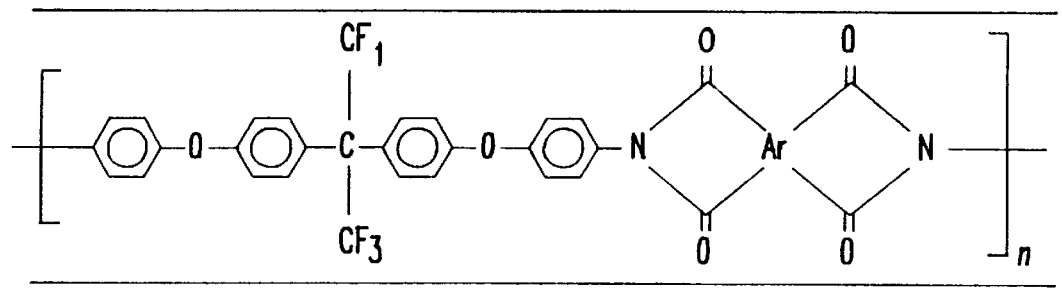
FIG. 4A shows a preferred class of thermoplastic polymers for use in the present invention.

Although polyimides will be used to illustrate thermoplastic flexible polymers in the present invention, the invention is not so limited. Preferred thermoplastic polyimides for use in this invention include those polyimides having the general structure shown in FIGS. 4A, 4B, and 4C.

LARC-TPI® and ARUM® thermoplastic polyimides, commercially available from Mitsui-Toatsu Chemicals, Inc., have excellent flow properties and thermal stability, and are particularly preferred thermoplastic polymers for use in the present invention. By combining such polyimides with thermotropic LCPs as taught herein, the orientation can be controlled and the CTE can be tailored.

Figure 4B:
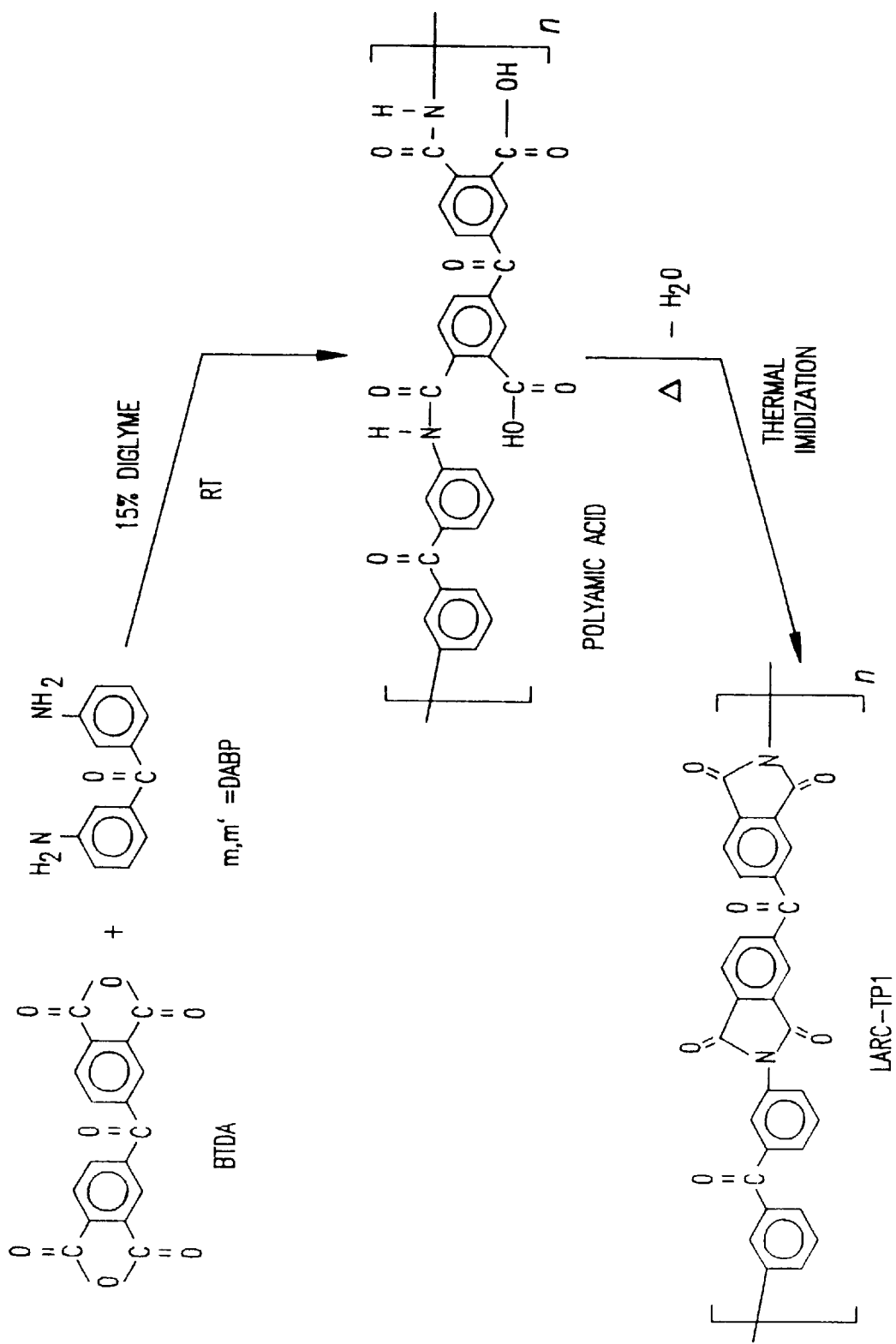
FIG. 4B shows a particularly preferred polyimide for use in the present invention.
Figure 4C:
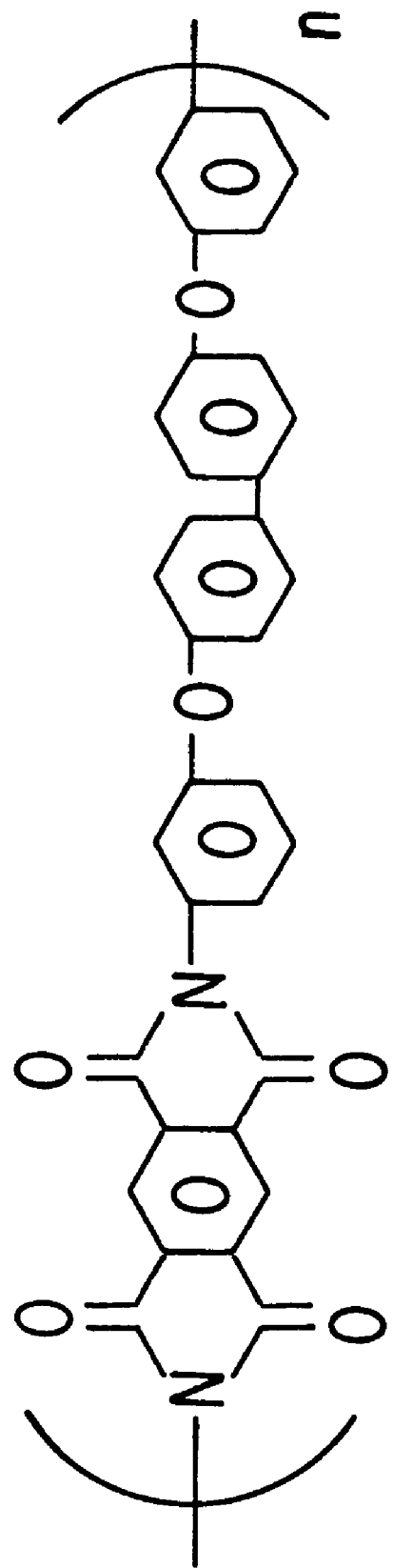
FIG. 4C shows another particularly preferred polyimide, ARUM,® formerly known as NEW-TPI® for use in the present invention.

The chemistry of LARC-TPI® is shown in FIG. 4B. In the imide form it can be formed, laminated, or molded in the substantial absence of solvents or evolved materials. LARC-TPI® achieves its processability and its suitability for lamination through chemistry based upon a polyamic acid precursor capable of imidization by further heating. The imidized film offers good adhesion, flow and flexibility at moderate temperatures, with the chemical and thermal resistance increasing dramatically after heat treatment (increased imidization). As a linear aromatic polyimide, LARC-TPI exhibits the chemical insensitivity, high thermal resistance, low moisture sensitivity, radiation and thermo-oxidative resistance and good mechanical properties of other materials of this class (e.g., ULTEM®, bismaleimide, THERMID®). These properties are relevant to aircraft and aerospace applications, where lightweight, stiff structures are needed; and to electronic circuit board applications, where the high temperature (soldering) resistance and dimensional stability are most attractive.

Figure 5A:
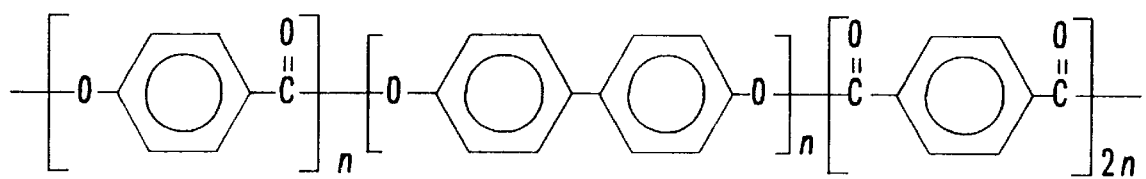
FIG. 5A shows one general formula for XYDAR,® one preferred type of TLCP for use in the present invention.
Figure 5B:
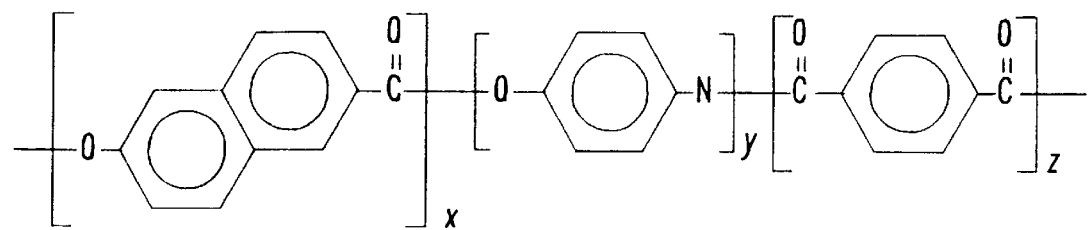
FIGS. 5B and 5C show general formulae for VECTRA,® another particularly preferred type of TLCP for use in the present invention.
Figure 5C:
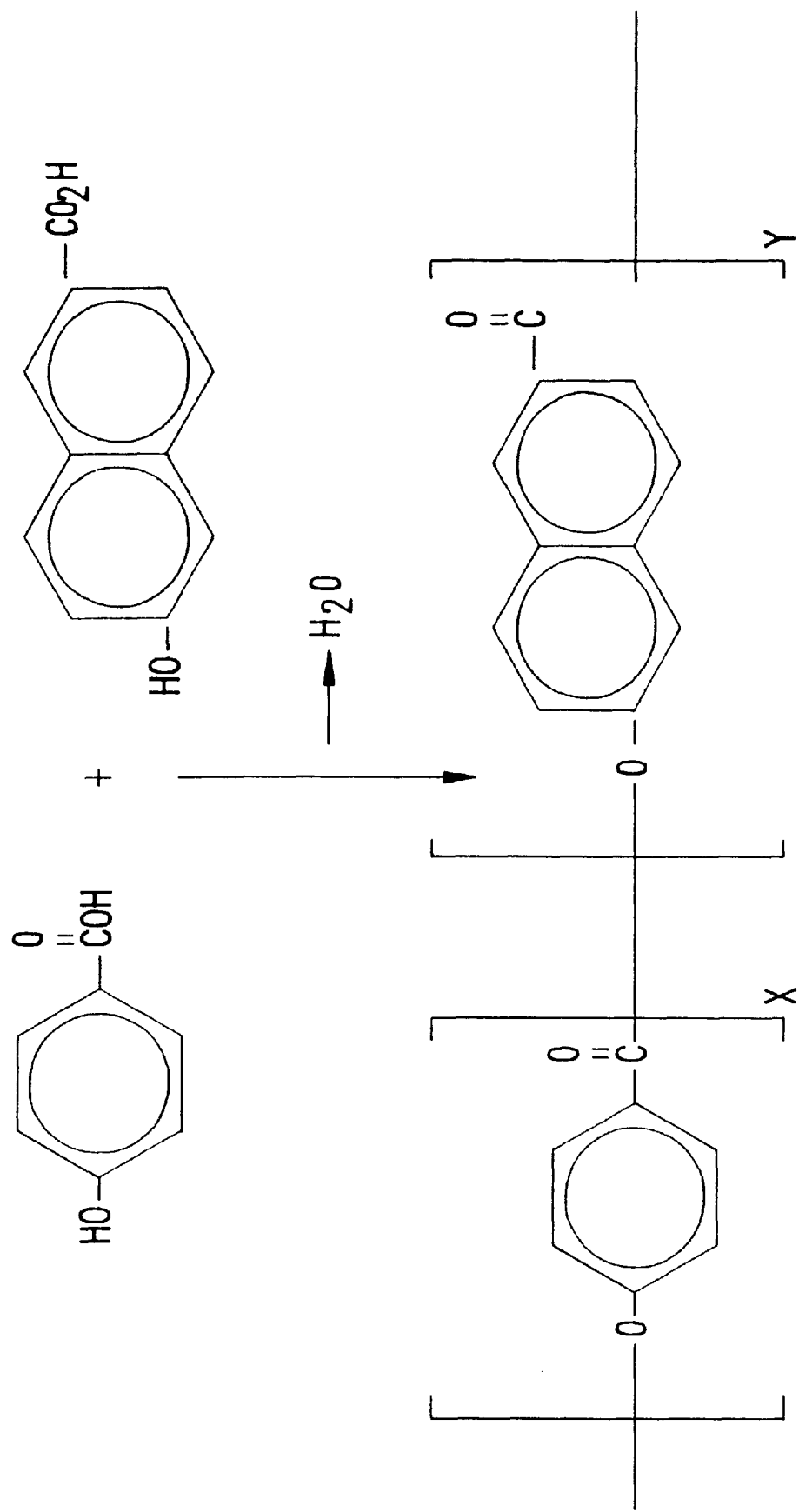

Two especially preferred classes of thermotropic liquid crystalline polymers exhibiting desired performance characteristics for use in the present invention are Amoco's XYDAR® TLCPs and Hoechst-Celanese's VECTRA® TLCs polymers. The general chemical structures of these polymers are shown in FIG. 5.

Processing characteristics and compatibility are considerations in selecting the appropriate thermoplastic polymers and TLCP(s) for use in the blends in accordance with the present invention. By compatibility is meant both thermodynamic miscibility and the relative Theological properties between the phases. Usually, polymer blends are immiscible, and none more so than rigid-rod LCPs with flexible chain polymers. However, too great a miscibility may eliminate the hierachical fibrillar structure present, thereby reducing the effectiveness of the reinforcement provided by the high modulus TLCP.

Other conventional ingredients are optionally included in the polymer blends of the present invention. Such ingredients include, pigments, fillers, stabilizers and so forth, well-known to those of ordinary skill in the art of polymer processing.

The processability of the polyimide was greatly enhanced through reduction in the melt viscosity by virtue of the incorporation of the TLCP into the blend. When processed in accordance with the teachings of the present invention, high shear forces and temperature control applied to such blends during extrusion, impart a laminar arrangement of the polymer molecules, much like a deck of cards, resulting in high resistance to gas permeation through the film.

The present invention will be illustrated by multiaxially oriented films having a planar morphology wherein the film comprises XYDAR® LCP or a blend of XYDAR® LCP and a polyimide. However, it is understood that the present invention is not so limited.

In accordance with the present invention a laminar layered type of morphology is achieved to obtain improved barrier properties. Special processing means are more effective at producing layered morphology than the previously disclosed means for making fibrillar reinforcement, i.e. , disclosed in the CRD Patents and in co-pending Ser. No. 07/678,080.

The following are processing parameters which will produce a planar layered morphology in the LCP regions of the blend:

1. High transverse shear produced by rotation raze of the circular die. Rotation rate should be higher than that used to produce film with the best mechanical properties in the extrusion direction. The rotation rate for production of film with the best barrier properties, i.e., planar morphology, could be 2 to 5 times higher than that for the best mechanical properties, i.e., fibrillar morphology.
2. The LCP phase must be melted and be at a low viscosity relative to the thermoplastic phase.
3. The film should be drawn equally in two orthogonal directions after extrusion from the die, while the LCP-thermoplastic blend is in a partially solidified state. In contrast, film with high mechanical properties is typically drawn preferentially in one of two orthogonal directions.
4. Laminar flow conditions (rather than turbulent conditions) are maintained in the die.

Although some of the conditions used to produce the layered morphology of the present invention are the same as the conditions disclosed in the CRD Patents to produce the fibrillar morphology, more specialized controls are needed. This is because a fibrillar (one-dimensional) morphology is easier to achieve via extrusion than a planar (two-dimensional) one. The fibrils are discrete and have a small diameter and can be thought of as one-dimensional, i.e., having length only. In contrast in the planar morphology, the individual "layers" are formed of many fibers and can, thus, be thought of as two-dimensional, i.e., as having width, in addition to length.

The counter-rotating die itself is not sufficient to create planar morphology. Temperature, shear rate, total shear strain, axial flow rate, pressure, and draw ratios must all be controlled in as taught herein to produce the layered LCP microstructure, rather than a fibrillar arrangement of the LCP molecules.

Extrusion conditions described in TABLE 3 are for the production of films comprising TLCP/polyimide blends having a fibrillar morphology. These conditions were modified to produce the planar morphology of the present invention. The 10% XYDAR®/90% ARUM® film shown in FIG. 7B and the XYDAR® LCP film shown in FIG. 7A were produced under the following conditions.

| Powder | Feed Rate (g/min) | Screw Speed (rpm) | Temperature (° F.) | | | |
|---|---|---|---|---|---|---|
| | | | Zone 1 | Zone 2 | Zone 3 | Die |
| 10% XYDAR® 90% ARUM® | 28 | 98 | 700 | 720 | 730 | 725 |
| XYDAR® | 25 | 110 | 610 | 650 | 640 | 630 |

Additionally, a glass tube cooling ring was used outside the die to quench the melt and :he screw compression ratio was 6:1 rather than 4:1 as described in the Examples which follow.

In general, high shear and control of temperature are important to achieve the planar morphology in the LCP region of the blend. High transverse shear is produced by controlling the rotation rate of the GRD as described above. The temperature is controlled by controlling both the die and the exit temperature. Upon the die the extrudate was blown against a chilling ring which controls the temperature at that point.

The exit temperature of the extrudate should be slightly below the melt, i.e., the exiting polymer is partially solidified. If it is in the fully molten phase, it does not have melt strength (strength of extrudate) to be blown. It must be tacky enough to be capable of orientation and have enough strength to be blown without exploding.

To get the planar morphology, the temperature of the extrudate is slightly lower then for obtaining the standard fibrillar film.

Figure 6:
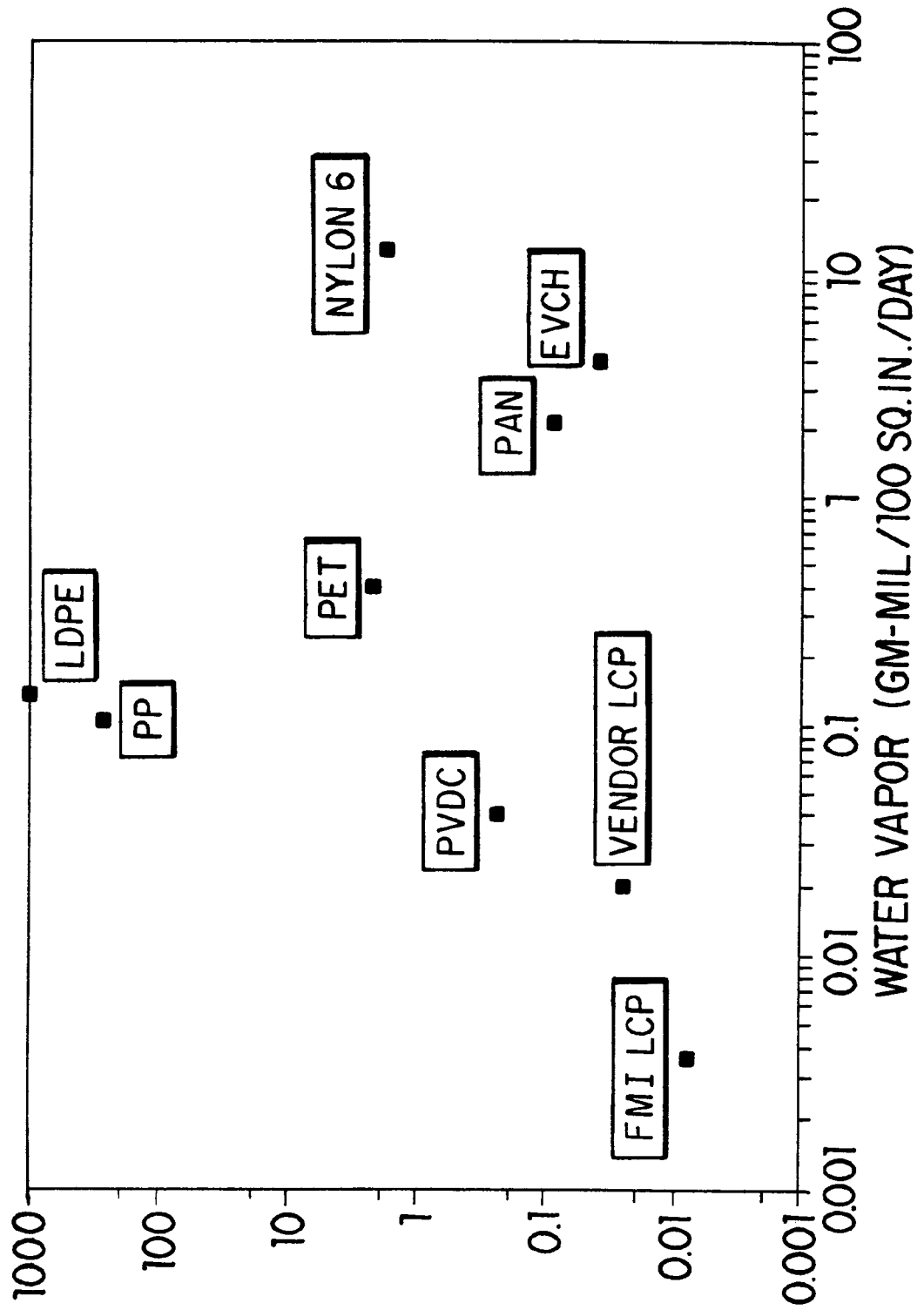
FIG. 6 show a comparison of barrier properties of a film produced in accordance with the present invention, i.e., FMI LCP, and conventional barrier films.

FIG. 6 compares the barrier properties of a film comprising XYDAR® thermotropic LCP polymer, processed in accordance with the present invention with some standard barrier films produced using conventional extrusion technology, i.e., not by use of the technology disclosed in the CRD Patents or in the present application.

In FIG. 6, the block labeled "FMI LCP", represents XYDAR® TLCP processed in accordance with the present invention to produce a planar morphology. The block labeled "Vendor LCP" represents an LCP produced using conventional extrusion technology. It can be seen that oxygen permeability is improved by an order of magnitude and water vapor permeability is improved by eight, as compared with Vendor LCP.

Figure 7A:
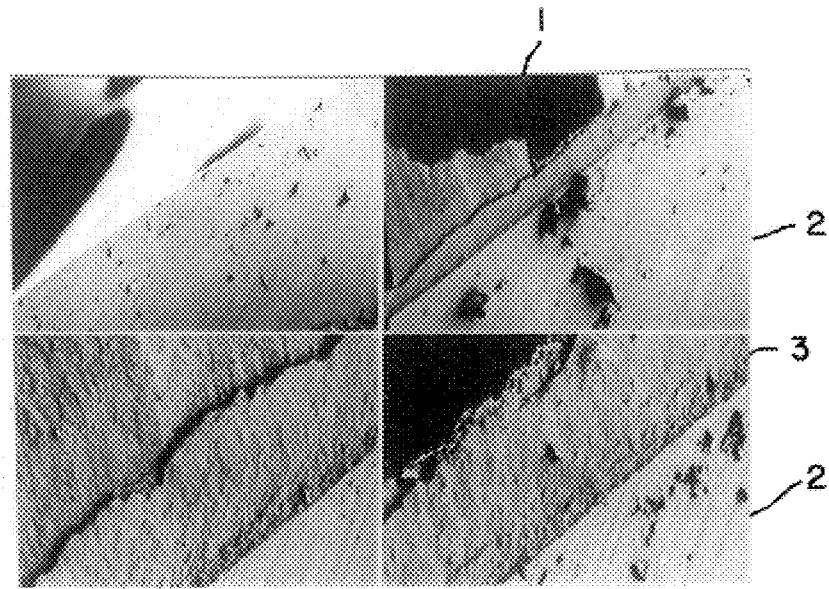
FIG. 7A shows electron micorgraphs of a XYDAR® LCP film having a planar morphology in accordance with the present invention.
Figure 7B:
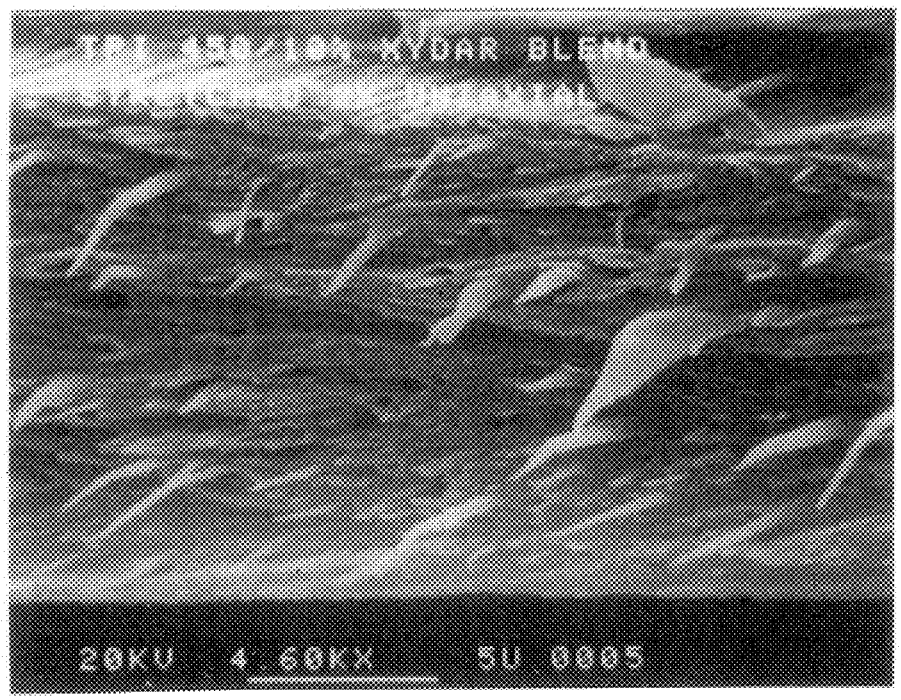
FIG. 7B shows an electron micrograph of a film having a planar morphology in accordance with the present invention, wherein the film comprises 10% XYDAR® LCP and 90% ARUM.®

FIG. 7A show electron micrographs of the FMI LCP described above. The bottom layer is shown at 1, the top layer is shown at 2, and an intermediate layer is shown at 3.

The barrier properties of films comprising blends of thermoplastic flexible polymers and thermotropic LCPs produced in accordance with the present invention were compared with the barrier properties of (i) a film comprising the thermotropic LCP extruded using conventional extrusion technologies and (ii) a film comprising a blend of thermoplastic flexible polymer and thermotropic LCP, also extruded using conventional extrusion technology.

These studies were conducted with films of ARUM®/XYDAR® blends containing up to 30 wt percent LCP.

The barrier properties of a thermoplastic film processed through the CRD substantially improve with the addition of an LCP phase. For example, by processing a blend of polyimide and LCP, the permeability of the film to oxygen decreased by eightfold and to water vapor by over sixteenfold by adding as little as 10 wt percent XYDAR® LCP to the polyimide. An electron micrograph of this film is shown in FIG. 7.

Figure 3A:
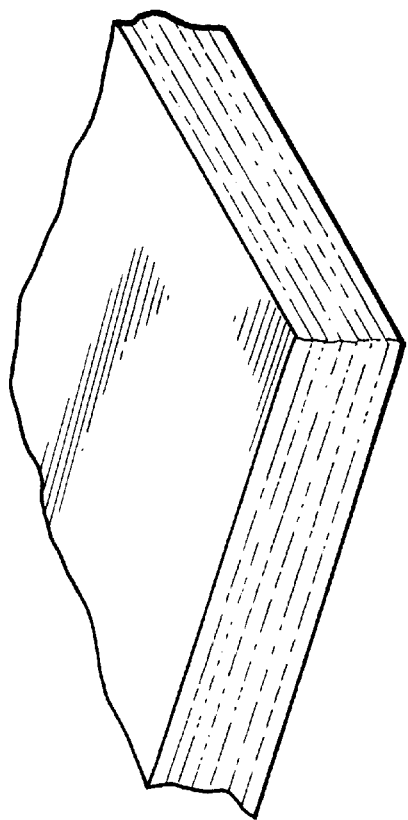
FIG. 3A shows a schematic representation of the planar morphology of the present invention.
Figure 3B:
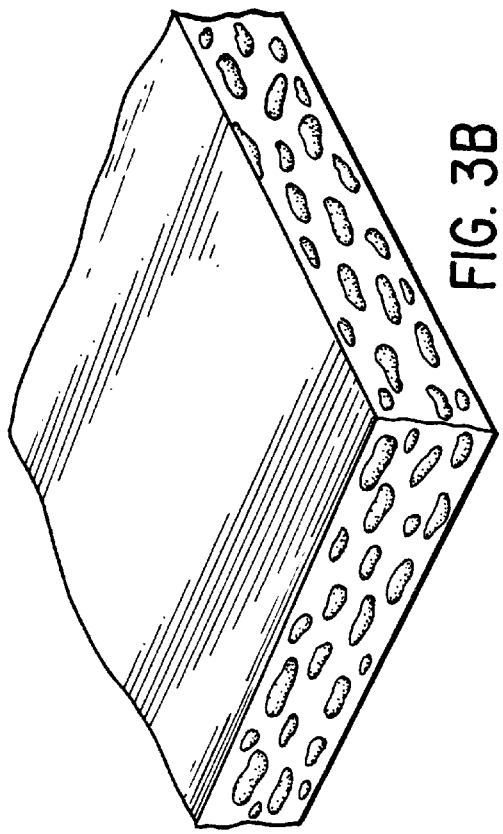
FIG. 3B show a schematic representation of droplets of LCPs in a thermoplastic polymer matrix.

The reason for this improved barrier performance is that the LCP regions are thought to form a laminar arrangement in the blend. It is estimated that these layers are approximately 0.1 to 1.5 micron thick, and overlap one another. In comparison, a composite film not made using the technology in the CRD Patents, will contain discrete LCP regions which form particles that are neither laminar not overlapping. This particulate arrangement as shown in FIG. 3B contributes little to better barrier performance, unless the amount of LCP is very high, over 70% by volume.

Figure 8B:
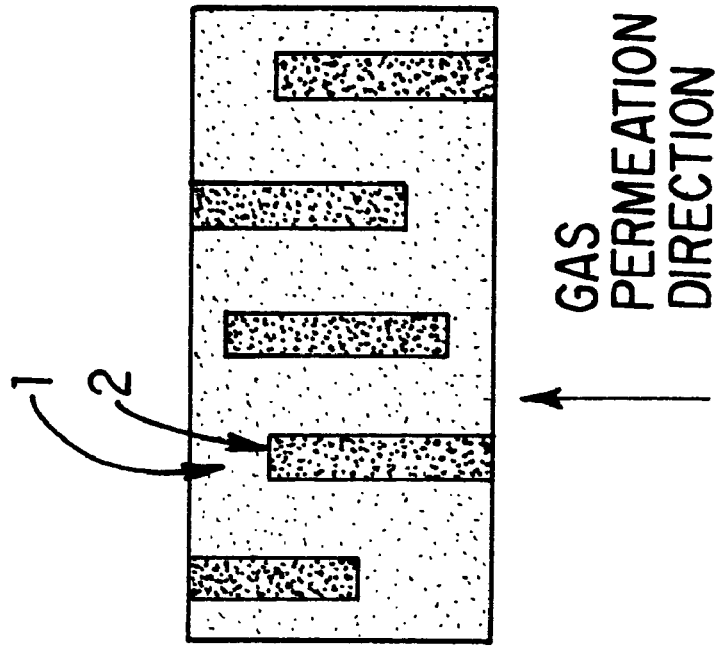
FIG. 8B illustrates the in-parallel arrangement achieved with fibrillar morphology.
Figure 8A:
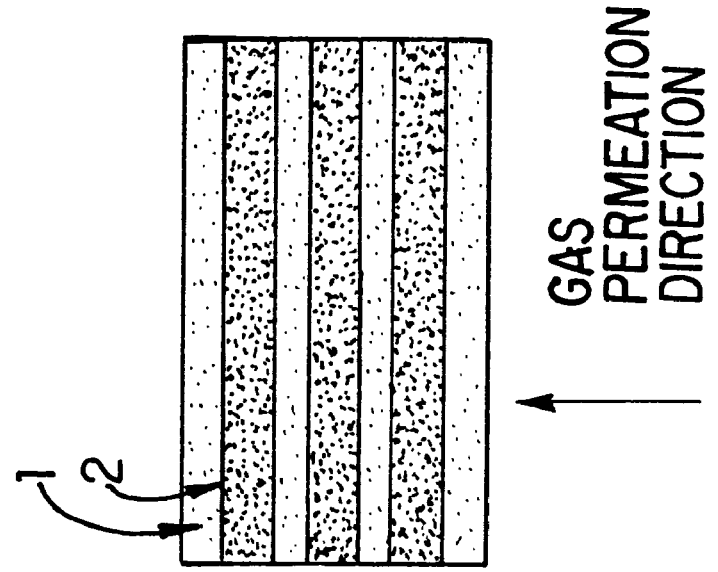
FIG. 8A illustrates the in-series arrangement of the present invention.
Figure 9:
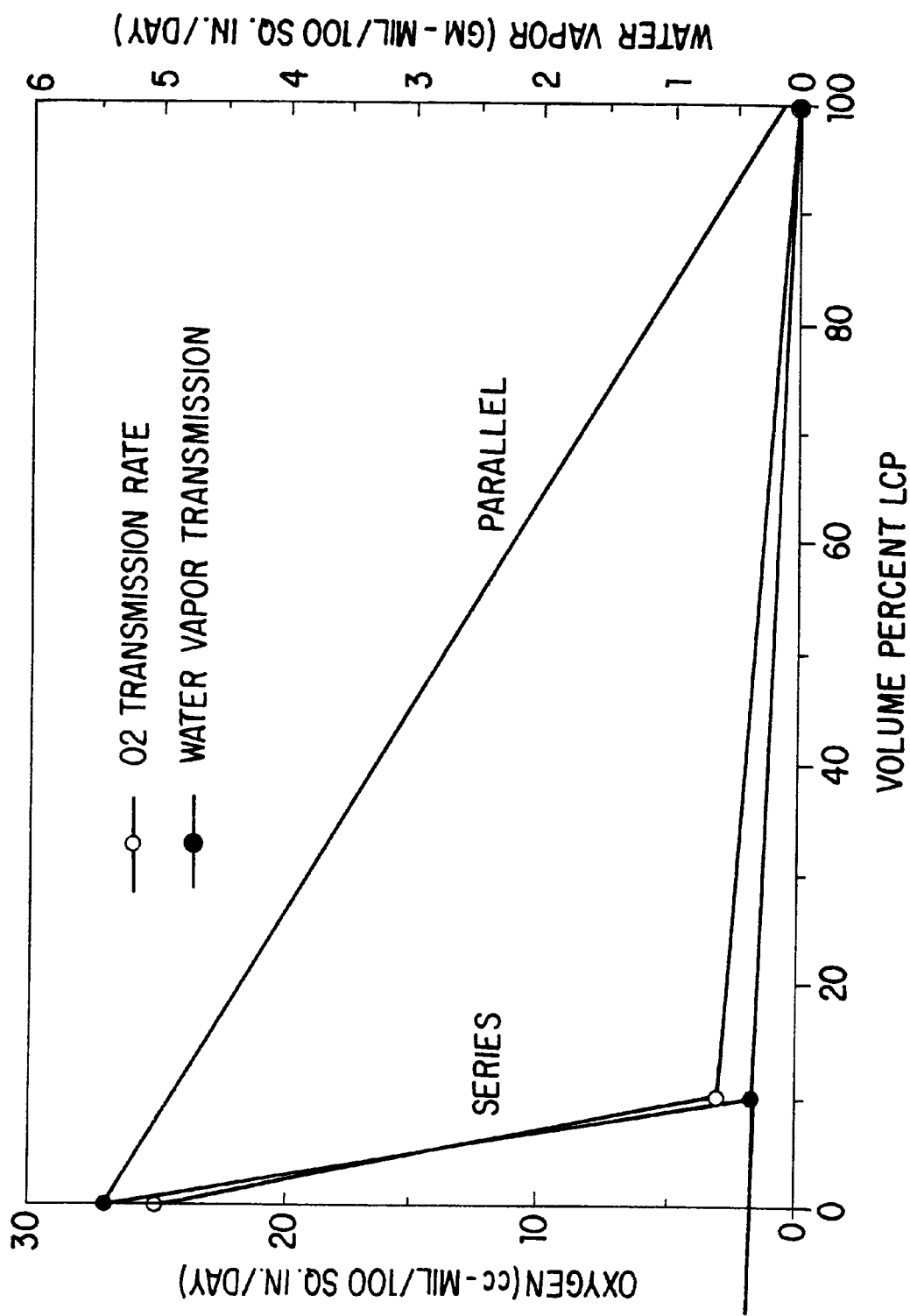
FIG. 9 shows how LCP addition substantially reduced the permeability of oxygen and water vapor through a polyimide film.

CRD processed blend films put the laminar LCP layers. "in-series" to the permeation direction; the conventional process places the LCP region "in parallel" with the permeation direction. FIG. 8A shows "in-series" arrangement and FIG. 8B shows "in-parallel" arrangement. This has a significant effect on the barrier properties of the composite, such that the F-M "series" composites are 10 to 100 times better than the "parallel" composites. Barrier properties in "series" can be represented by the equation $Bc=V1B1+V2B2$ and barrier properties "in parallel" can be represented by the equation $Pc=V1P1+V2P2$, where:

B—Barrier Property
P—Permeability (-i/B)
V—Volume Fraction
c—Composite
1—Thermoplastic
2—LCP FIG. 9 shows the permeability relationships for the two types of composite films. In the "parallel" composite, tine permeability of the composite is the arithmetic sum of the permeability of each component. The permeability of each component is given by the volume fraction times the inherent permeability of the material. In the "series" composite, the barrier property (reciprocal of permeability) of the composite is the arithmetic sum of the barrier property of each component. This results in an idealized hyperbolic relationship between composite permeability and volume fraction of the LCP. Since the permeability of the LCPs is 100 to 1,000 times lower than that of the base thermoplastic resin, the difference between "series" and "parallel" relationships is dramatic. The data of 10% LCP in the polyimide indicates that a "series" composite barrier film was achieved using the modification of the methodology of the CRD Patents.

Examples 1 to 4, which follow, describe experiments which are disclosed in co-pending Ser. No. 07/678,080 in which a fibrillar morphology was produced. These examples are included to aid in the understanding of the present invention. Standard commercially available reagent grade chemicals were used whenever possible.

A ¾ in. single screw extruder with three heating zones was used in the Examples. A counter-rotating die (CRD), were used to produce multiaxial films and multiaxial tubes by melt processing XYDAR® fully imidized LARC-TPI® powder, and blends thereof. Extrusion grades of the polymers were used wherever possible.

EXAMPLE 1—ROD DIE EXTRUSION

As explained above, prior to melt extrusion, an appreciation of the polymers Theological properties is necessary, both in order to select appropriate polymers for blending and to select extrusion conditions. If these properties are not available, e.g., in the literature or from the manufacturer, they may be determined in accordance with well-established methodology.

The melt viscosities of polymers used in the examples were obtained from the manufacturers, from literature, and, where needed, measured by Foster-Miller using a parallel plate rheometer and conventional methodology.

A rod die was used to help identify the most suitable LARC-TPI® type polymer for use in the present invention (i.e., Mitsui grades versus DURIMID®) and to determine the general conditions for multiaxial extrusion through the CRD. Both the rod die and the CRD were used with the same extruder, so the information gained from one could be related to the other system. The rod die had a die gap of 0.635 cm (0.25 in.) and a temperature capability of 370° C. (700° F.).

In all, the following polymers were extruded through the rod die:

Neat DURIMID®
DURIMID® containing 10 weight percent 6F Diimide
DURIMID® containing 5 weight percent VECTRA®
Mitsui 1500 -LARC-TPI®
Mitsui 2000 LARC-TPI The extrusion conditions for these systems are summarized in Table 1 below.

TABLE 1

EXTRUSION CONDITIONS FOR LARC-TPI POWDERS PROCESSED THROUGH A ROD DIE

| Powder | Feed Rate (g/min) | Screw Speed (rpm) | Temperatures (° F.) Zone 1 | Zone 2 | Zone 3 | Die | Comments |
|---|---|---|---|---|---|---|---|
| Durimid | 30 | 75–100 | 695 | 695 | 700 | 685 | Unable to produce any extrudate |
| Durimid + 10% 6F Diimide | 30 | 75–100 | 520 | 550 | 550 | 525 | Material experienced long residence times and became degraded |
| Durimid + 20% 6F Diimide | 30 | 75–100 | 460 | 470 | 470 | 470 | Degraded |
| Durimid + Vextra | 30 | 75–85 | 620 | 630 | 630 | 620 | Low integrity extrudate resulted due to incompatible melt temperatures and poor flow of the Durimid |
| Mitsui 1500 | 30 | 75–100 | 630 | 650 | 650 | 660 | Excellent extrudate, |

TABLE 1-continued

EXTRUSION CONDITIONS FOR LARC-TPI POWDERS PROCESSED THROUGH A ROD DIE

| Powder | Feed Rate (g/min) | Screw Speed (rpm) | Zone 1 | Zone 2 | Zone 3 | Die | Comments |
|---|---|---|---|---|---|---|---|
| Mitsui 2000 | 30 | 75–100 | 590 | 595 | 600 | 585 | good flow and low residence times will allow the production of good quality films. Poor extrudate, unable to produce quality rods due to instability of the material |

Extrusion temperature - Zone 1: where material is fed into the extruder to soften the material.
Extrusion temperature - Zone 2: where material is mixed and sheared and begins to melt; also referred to as the transition zone.
Extrusion temperature - Zone 3: where material is fully melted under shear and travels to the die.
Extrusion temperature - Zone 4: where the temperature is near that of Zone 3 to allow good flow and film formation.
Residence time - the length of time the material is exposed to high temperature and shear in the extruder. (Long residence times cause the material to degrade.)
Screw Speed - the speed at which the screw turns.
Feed Rate - the speed at which material is fed into the extruder.
Takeup speed - the speed at which extrudate is pulled from the die.

These conditions, along with the quality of the extrudates, were used to select the preferred materials for multiaxial extrusion, and, to set initial extrusion temperature, residence time, screw speed, feed rate, and takeup speed. The most promising grade of LARC-TPI® for extrusion purposes was the Mitsui 1500 which exhibited a consistent rheology and thermal stability. It was also least dependent on residence time which made it more attractive than other grades of LARC-TPI®.

DURIMID® and Mitsui 2000 LARC-TPI® was not successfully extruded through the rod-die extruder due to their high melt viscosity (>$10^7$ poise) and their volatile nature. The DURIMID® powder was not end-capped, resulting in a molecular weight increase in the extruder during processing. To avoid this, a residence time in the extruder of less than one minute was required, but this did not allow complete melting of the powders inside the extruder. The Mitsui 2000 LARC-TPI® is also not extrusion grade and is less stable than Mitsui 1500 LARC-TPI®. The resulting rods exhibited poor mechanical integrity and large voids, which indicated some outgassing had occurred. Addition of 6F Diimide and LCP VECTRA® markedly lowered the viscosity of DURIMID®, but volatilization still occurred. Based on these studies of LARC-TPI® type polyimides, Mitsui 1500 LARC-TPI® polyimide was selected for extrusion through the CRD.

EXAMPLE 2—MELT EXTRUSION OF FILMS COMPRISING LARC-TPI® AND LARC-TPI®/XYDAR® BLENDS

Figure 1A:
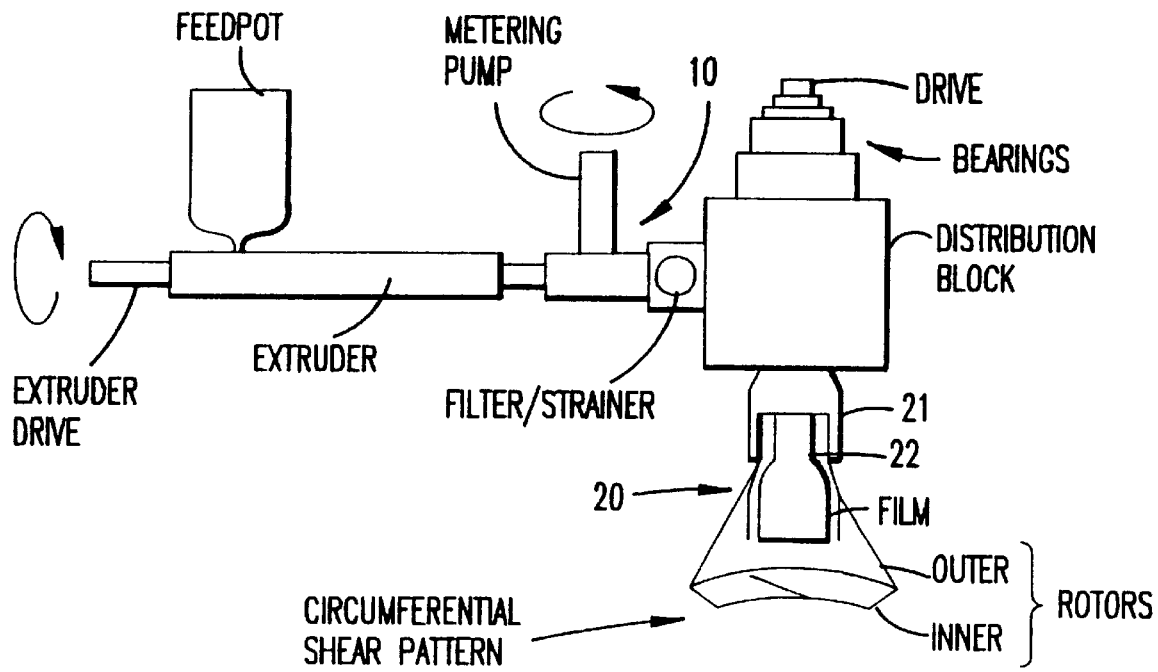
FIGS. 1A and 1B show a schematic illustration of one process in accordance with the present invention.
Figure 1B:
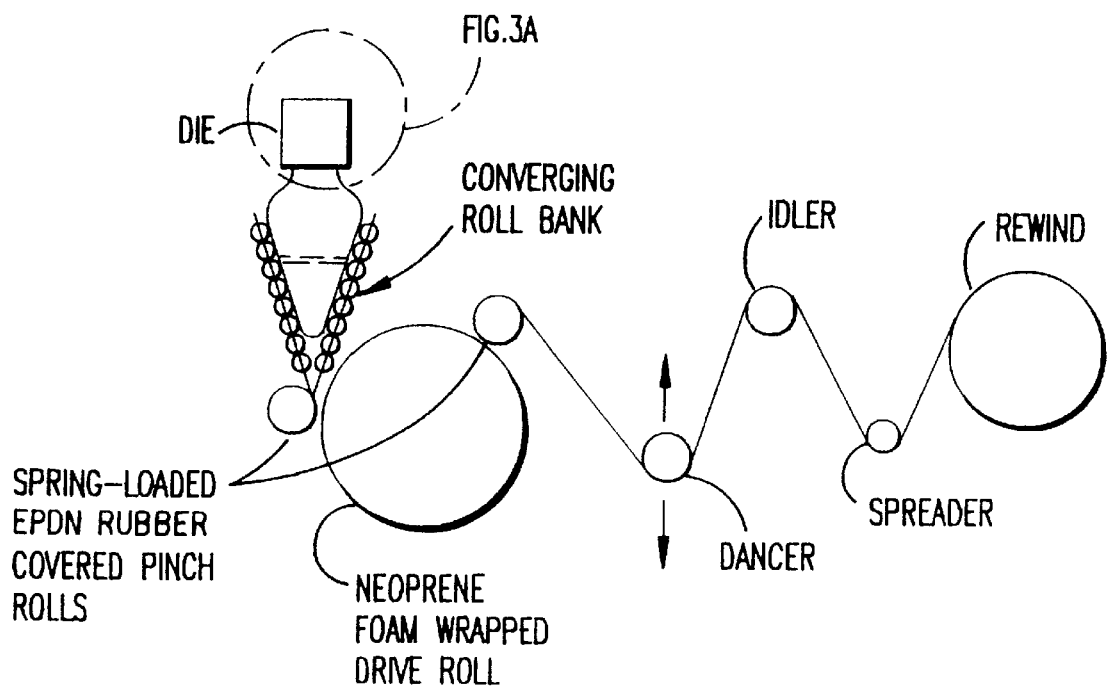
Figure 2A:
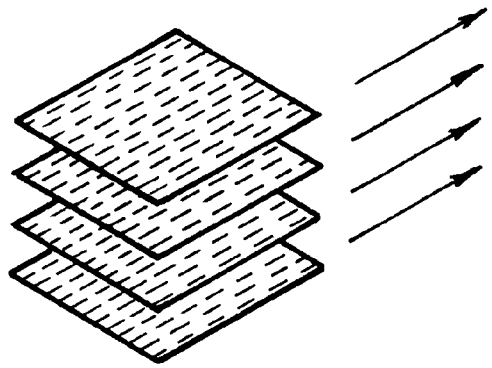
FIGS. 2A and 2C illustrates various orientations that can be imparted to ordered polymers by stress conditions.
Figure 2B:
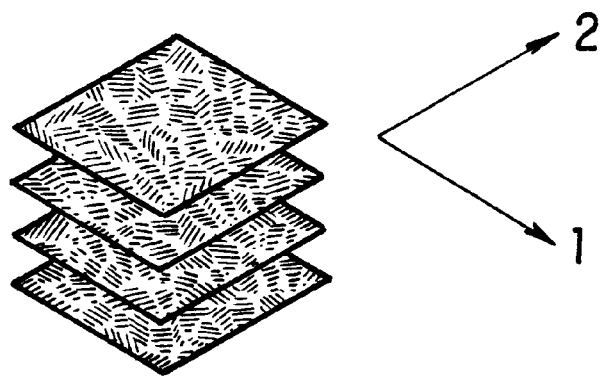
FIG. 2B illustrates the scattered or random nematic orientation of ordered polymers in solution.
Figure 2C:
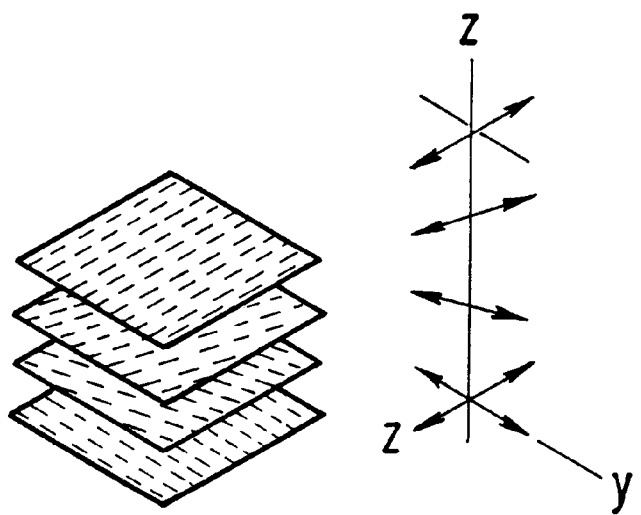

Two types of films, neat Mitsui 1500 polyimide LARC-TPI® and Mitsui 1500 LARC-TPI®/XYDAR® blends, were extruded through a CRD similar to that shown in FIG. 1A. Two volume fractions XYDAR® at 10 and 30 volume percents were produced.

The 1500 LARC-TPI® used for this study was a fully imidized polyimide with an average particle size of 5 to 7 micrometers. Since it was not available in large quantities, several 5-lb batches had to be used for the different extrusion experiments. However, because this was an experimental grade material, the glass transition temperature varied from batch to batch and its melting point was in the range of about 285 to 305° C. The $T_g$ of each batch was determined using a differential scanning colorimeter (DSC), followed by parallel plate rheometry co determine the polymer's viscoelastic properties.

Figure 10A:
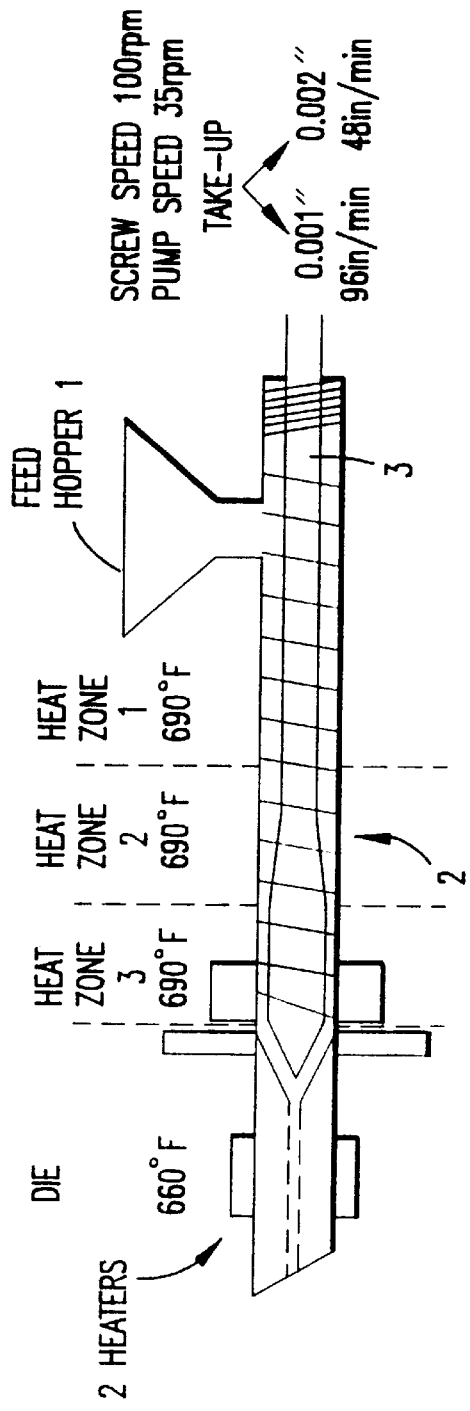
FIGS. 10A to 10C show extrusion conditions for biaxial extrusion of films in accordance with the present invention.
Figure 10B:
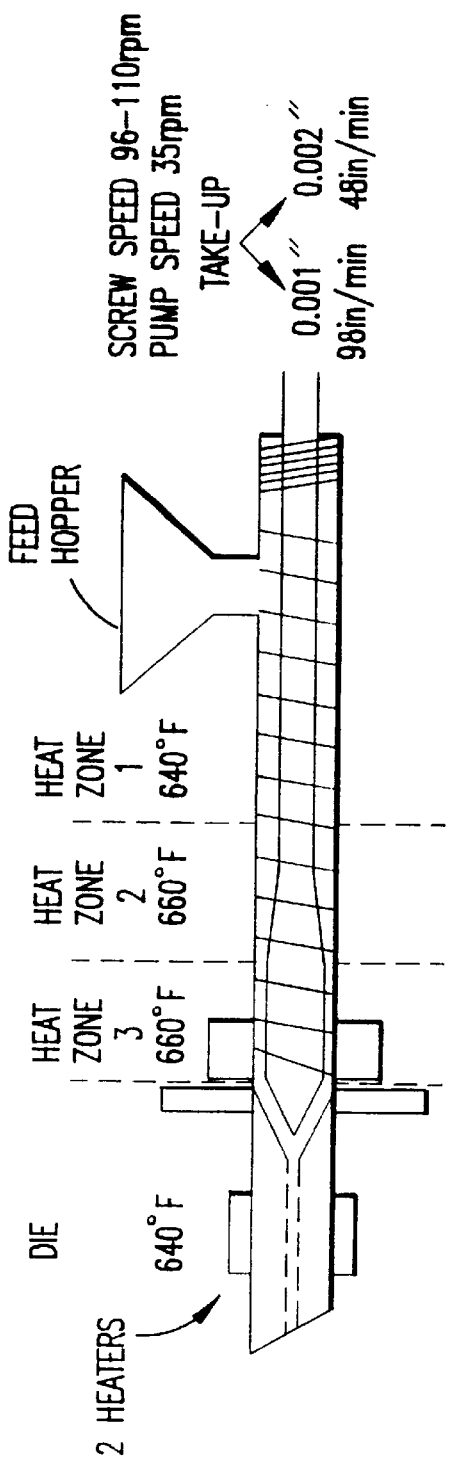
Figure 10C:
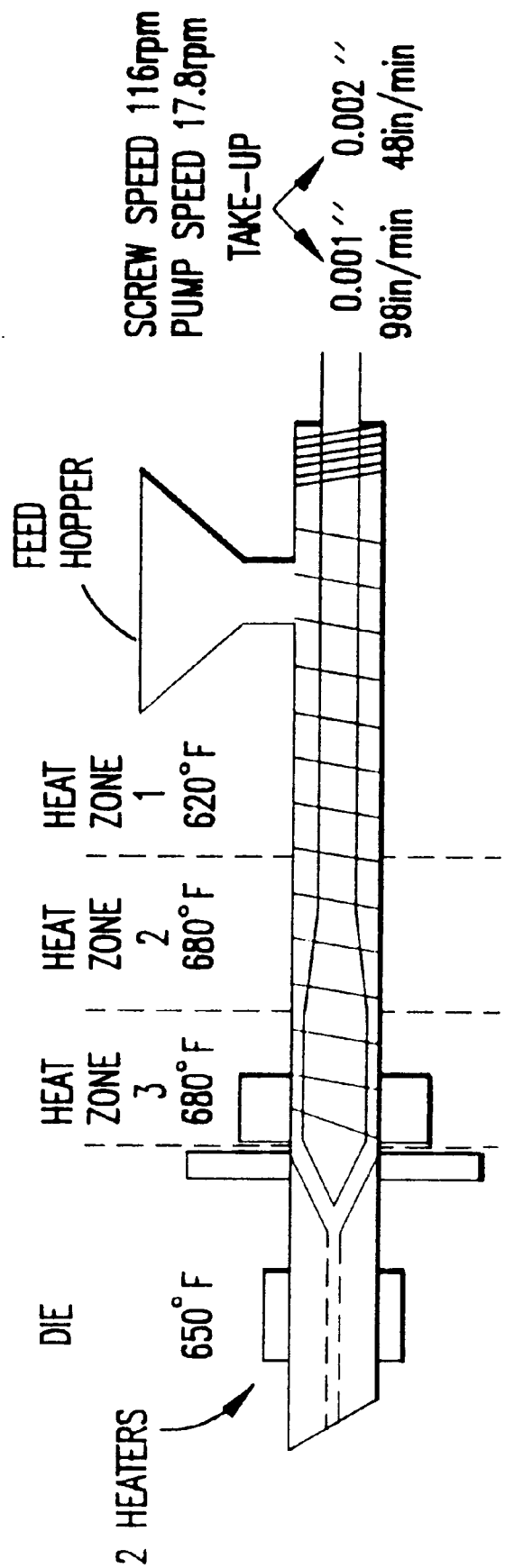

Two types of neat LARC-TPI® films were extruded through the CRD. In the first case, highly drawn near-uniaxial film was processed. In the second case, film was extruded with more transverse orientation. FIGS. 10A–10C summarize preferred conditions for the extrusion of multi-axially oriented Mitsui 1500 LARC-TPI®.

The extrusion process involved first drying the LARC-TPI® polyimide powder at 150° C. for 12 hours to remove moisture. Next, as illustrated in FIG. 10, the powder was introduced into the feed-hopper 1, a nitrogen purged enclosed chamber where powders were protected against moisture during the extrusion process. Next, the powder was fed into the extruder 2 at a rate of 25 to 30 g/min and carried inside the extruder where it was heated. The heated polyimide was carried forward in the barrel via the screw 3, applying shear during the process. The amount of shear depends on two variables, screw speed and the screw compression ratio. Compression ratio is the ratio between the depth of the grooves (teeth) in the back versus the tip of the screw. A 4 to 1 compression ratio to screw was used in this work. For comparison, liquid crystalline polymer XYDAR® is often processed using a 6 to 1 compression ratio screw. The shear rate constantly increased as the material was moved forward in the barrel. The LARC-TPI® eventually exhibited viscoelastic (flow) behavior as a result of a combination of heat and high shear. The viscosity of the LARC-TPI® at this stage was in the range of 1E4 to 1E5 poise. At this point, the polyimide went through a pump block 10 (FIG. 10A) and into the counter-rotating die 20 (FIG. 10A). Once inside the CRD 20, the counter-rotating mandrels 21, 22 applied more shear to the extrudate, thus imparting additional orientation to the exiting film. The exiting film was cooled once it is exposed to room temperature conditions. It was then nipped via nip-rollers which take up the extruded film at a designated rate based on the desired angular orientation. The angular orientation of the finished film was a function of the amount of material entering the die, the rate at which the CRD spins and the rate of take up. See FIG. 10B.

Of the LCPs considered for this works XYDAR® and VECTRA®, XYDAR® was considered the most suitable match for LARC-TPI®. It is available in powder form, and can be extruded at temperatures close to that of LARC-TPI®.

XYDAR® and LARC-TPI® powders were mechanically mixed and dried at 150° C. for 12 hours prior to extrusion as described above. To determine the extrusion conditions, sample powders of the mixture were characterized using a differential scanning colorimeter (DSC) and parallel plate rheometry. FIGS. 10B and 10C summarize the extrusion conditions for 10 weight percent and 30 weight percent XYDAR®, respectively. The extrusion process was the same as described herein above. Two types of films, near-uniaxial, and more transverse, were extruded. The properties of these blended films are summarized in Table 2.

EXAMPLE 4—BLENDS OF OTHER THERMOPLASTIC FLEXIBLE POLYMERS

Blends of VECTRA® between about 5 and 20% and the thermoplastic polymers polypropylene, polycarbonate and polystyrene between about 95 to 80% were also extruded under conditions similar to those described above, the main difference being a lower extrusion temperature. Balanced biaxial (±45 degrees) films varying in thickness from 0.001 inches (1 mil) to 0.005 inches (5 mil) were extruded.

The present invention has been described in detail, including the preferred embodiments thereof. However, it will be appreciated that those skilled in the art, upon consideration of the present disclosure, may make modifications, and/or improvements in this invention and still be within the scope and spirit of this invention as set forth in the following claims.

What is claimed is:

1. An article of manufacture comprising a multiaxially oriented film having a planar morphology, wherein the film comprises at least one thermoplastic flexible polymer,

TABLE 2

| Polymer | Orientation (Degree) | TM (GPa) MD | TM (GPa) TD | TS (MPa) MD | TS (MPa) TD | CTE ppm ° C. MD | CTE ppm ° C. TD | Elongation |
|---|---|---|---|---|---|---|---|---|
| 100% LARC-TPI | ± 24 | 2.8 | 2.8 | 97 | 104 | 34 | 34 | 10–20% |
|  | Near Uniaxial | 3.2 | 2.4 | 130 | 105 | 27 | 38 | 10% |
| 10% XYDAR/ 90% LARC-TPI | ± 24 | 5.1 | 3.2 | 140 | 98 | 12 | 38 | — |
| 30% XYDAR 70% LARC-TPI | ± 24 | 3.2 | — | 156 | — | 3–4 | 40 | — |
|  | Near Uniaxial | 3.0 | — | 101 | — | 12 | — | — |
| 30% XYDAR 12% LARC-TPI 58% NEW-TPI | Near Uniaxial | 3.15 | 2.25 | 143 | 100 | 3 | 15 | 50 |
| 10% XYDAR 90% NEW-TPI | ± 24 | 3.12 | 1.8 | 135 | 110 | 24 | 33 | 100% |
| 100% XYDAR | ± 24 | 6.2 |  | 137 | 100 | +2 | +8 | 5% |
| 100% NEW-TPI | ± 45 | 2.14 | 2.15 | 97 | 97 | 44 | 45 | 150% |

EXAMPLE 3—MELT EXTRUSION OF NEW-TPI® AND TERTIARY BLENDS

NEW-TPI® polyimide provided by Mitsui Taotsu Corporation was used in pellet form. ARUM® is highly processable and is a thermally stable polyimide.

Figure 11:
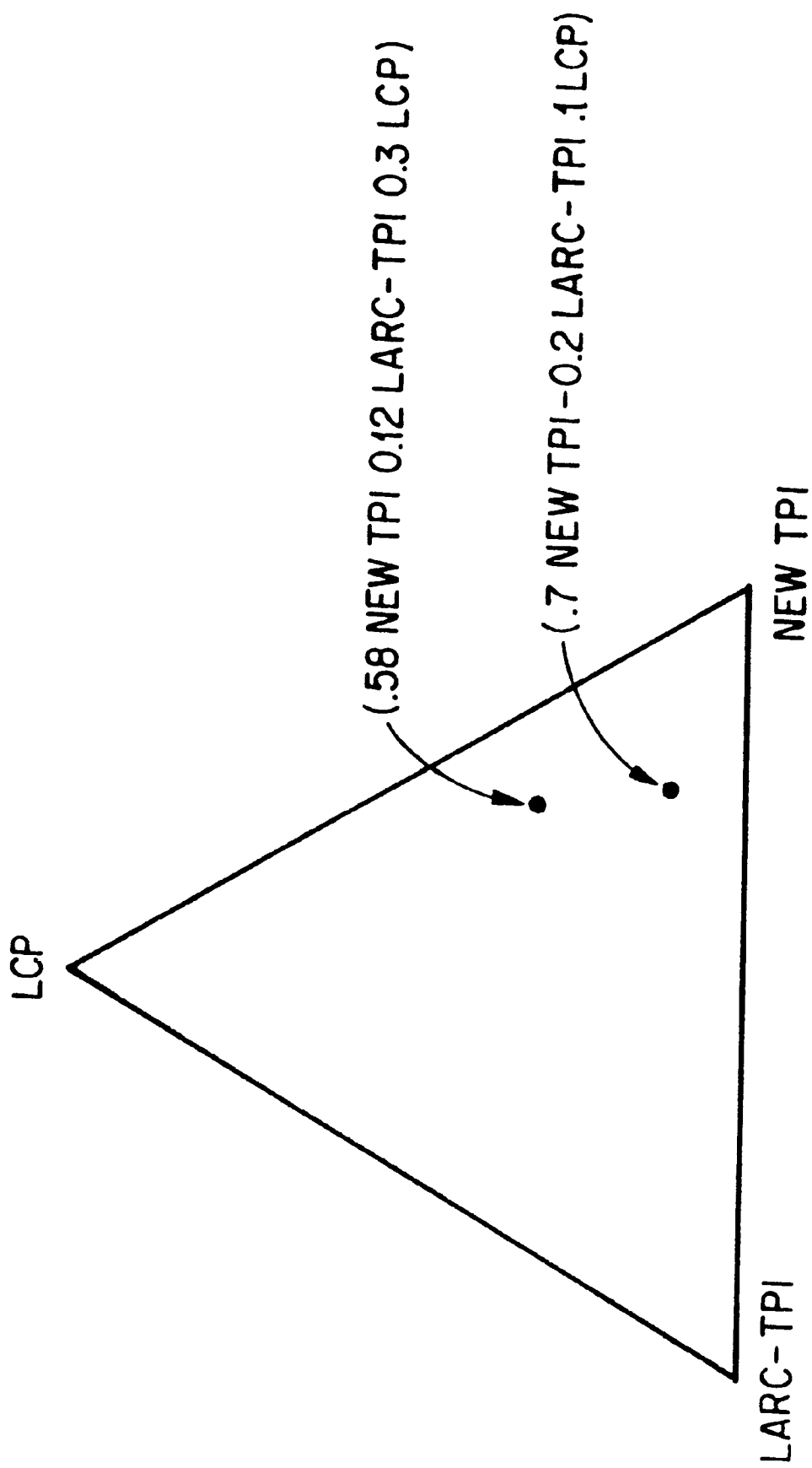
FIG. 11 is a schematic illustration of polyimide/TLCP tertiary blend systems.

FIG. 11 presents a schematic illustration of the tertiary blends studied. A combination of NEW-TPI® and LARC-TPI® was used in order to exploit the best properties of each system. LARC-TPI® is a higher modulus material which is better characterized than NEW-TPI®. NEW-TPI,® on the other hand, is available in pellet form, making it easier to process. It also yields a tougher finished product. Their combination resulted in easily reproducible and processable blends. The ratio of the NEW-TPI® to LARC-TPI® was fixed at 0.75 to 0.25 for all the tertiary systems. Only the weight percent LCP and its type were altered. These differences are discussed below.

A mixture of 0.75 to 0.25 NEW-TPI® to LARC-TPI® was prepared for tertiary blend formulations. LARC-TPI® powder was compacted. The compacts were broken into pieces sufficiently small to mix with NEW-TPI® pellets. The resulting mixture was then mixed with either XYDAR® pellets or VECTRA® pellets. Films with LCP content of 10 and 30 weight percent were produced using the method of Example 3 and characterized. See Table 2, supra.

wherein the thermoplastic flexible polymer is polyimide, polypropylene, polycarbonate, polystyrene, polyester, polyamide, poly(ethersulfone), poly(etherimide), polyetherketone, polyphenylene sulfide, polyarylate and blends thereof, and at least one thermotropic rigid-rod polymer, wherein the thermotropic rigid-rod polymer is a wholly or partially aromatic polyester or copolyester and blends thereof, the film having a planar morphology in the rigid-rod phase.

2. An article of manufacture in accordance with claim 1, wherein the thermoplastic flexible polymer is polyimide, polypropylene, polycarbonate, or polystyrene.

3. An article of manufacture in accordance with claim 2, wherein the polyimide is LARC-TPI®, ARUM® or blend thereof.

4. An article of manufacture in accordance with claim 1, wherein the thermotropic rigid-rod polymer is XYDAR® or VECTRA.®

5. An article of manufacture in accordance with claim 1, wherein the thermoplastic flexible polymer is present at from about 99 to 50 percent and the thermotropic rigid-rod polymer is present at from about 1 to 50 percent.

6. An article of manufacture in accordance with claim 1, wherein the thermoplastic flexible polymer is present at from less than about 95% to greater than about 80% and the thermotropic rigid-rod polymer is present at from greater than about 5% to less than about 20%.

7. An article of manufacture in accordance with claim 1, wherein the thermoplastic flexible polymer is present at about 90% and the thermotropic rigid-rod polymer is present at about 10%.

8. An article of manufacture in accordance with claims 5, 6 or 7 wherein the thermoplastic flexible polymer is a polyimide and the thermotropic rigid-rod polymer is XYDAR® or VECTRA.®

9. An article of manufacture in accordance with claim 8, wherein the polyimide is LARC-TPI® or ARUM® present at about 90% and the thermotropic rigid-rod polymer is XYDAR® or VECTRA® present at about 10%.

10. An article of manufacture in accordance with claim 9, wherein the permeability to oxygen is less than about 4 cc-Mil/100 Sq. In./Day at 1 ATM.

11. An article of manufacture in accordance with claim 9, wherein the permeability to water vapor is less than about 2.5 Gm-Mil/100 Sq. In./Day at 1 ATM.

12. An article of manufacture in accordance with claim 1, wherein the permeability to oxygen is less than about 10 c-Mil/100 Sq. In./Day at 1 ATM.

13. An article of manufacture in accordance with claim 1, wherein the permeability to water vapor is less than about 3 Gm-Mil/100 Sq. In./Day at 1 ATM.

14. An article of manufacture in accordance with claims 1, 12, or 13, wherein the article is recyclable.

15. An article of manufacture in accordance with claim 1, wherein the multiaxial orientation is about equal in two orthogonal directions in the film plane.

16. An article of manufacture in accordance with claim 1, wherein the article is a tube or a coating.

17. An article of manufacture comprising a multiaxially oriented film, wherein the film comprises a blend of at least one thermoplastic flexible polymer and at least one thermotropic rigid-rod polymer, the film having a planar morphology in the rigid-rod polymer phase.

* * * * *